United States Patent [19]
Morokuma et al.

[11] 3,804,491
[45] Apr. 16, 1974

[54] MULTILAYER REFLECTION PROOF FILM

[75] Inventors: Tadashi Morokuma; Tokujiro Kozawa, both of Tokyo, Japan

[73] Assignee: Olympus Optical Company Limited, Tokyo, Japan

[22] Filed: Aug. 15, 1972

[21] Appl. No.: 280,856

[30] Foreign Application Priority Data
Aug. 16, 1971 Japan.............................. 46-62172
May 1, 1972 Japan.............................. 47-43540

[52] U.S. Cl. ................................................ 350/164
[51] Int. Cl. ............................................. G02b 1/10
[58] Field of Search..................... 350/164, 165, 166

[56] References Cited
UNITED STATES PATENTS
3,176,574   4/1965   Socha ................... 350/164
3,706,485  12/1972   Fawcett ............... 350/164

*Primary Examiner*—Archie R. Borchelt
*Assistant Examiner*—C. E. Church
*Attorney, Agent, or Firm*—Eric H. Waters

[57] ABSTRACT

A multilayer anti-reflection film for use in high class camera lenses, microscope objective lenses, etc. has an anti-nonhomogeneous film held between a reflective film and a glass substrate and having a refractive index continuously changing in a direction perpendicular to said film and toward the outermost film from a refractive index which is equal to the refractive index of the glass substrate. The continuous change of refractive index of the nonhomogeneous film is effected by continuously changing a mixing ratio of the amount of vapors produced when both materials having large and small refractive indexes are vapor deposited on the glass substrate.

7 Claims, 8 Drawing Figures

FIG_3A

FIG_3B

FIG_4A

FIG. 4C

MULTILAYER REFLECTION PROOF FILM

This invention relates to a multilayer anti-reflection film, and more particularly to a multilayer anti-reflection film which makes use of a nonhomogeneous film.

When light rays arrive at and emerge from the boundary surface between glass and air, about 4 percent of light ray loss caused by reflection occurs at the boundary surface even when the light rays arrive at the boundary surface in a direction perpendicular thereto. As a result, the larger the number of the contact surfaces between the glass and the air, the smaller the transmittivity of light rays. It has recently been the common practice to apply a lens system having a number of lens surfaces to high class camera lens, objective lenses for use in microscopes, etc. In the lens system whose number of lens surfaces is 10, about 40 percent of light ray loss caused by reflection occurs. Thus, the light internally reflected in the lens system and arrived at a sensitive film in the camera or microscope results in a flare or ghost image.

In order to prevent such internal reflection in the camera lens, etc. the lens is coated on its surface with a thin film. Heretofore it has been the common practice to coat the lens surface with a multilayer anti-reflection film consisting of at least one layer. But, after 0.5 to 1.5 percent of the reflecting power still remained in the coated lens.

Figure 1A:
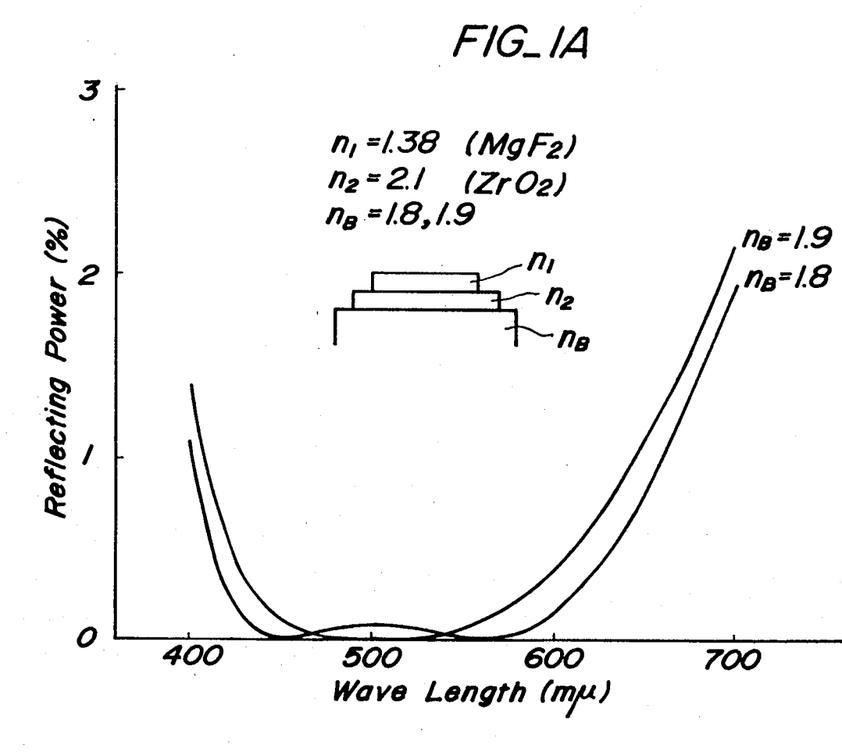
FIGS. 1A and 1B are spectral reflecting power characteristic curves of a conventional doublelayer anti-reflection film.

FIG. 1A shows spectral reflecting power characteristic curves of a conventional doublelayer anti-reflection film. In FIG. 1A, $n_B$ designates a refractive index of a glass substrate. If $n_B$ is 1.8 or 1.9, the glass substrate is coated with a first layer of $MgF_2$ having a refractive index $n_1=1.38$ and with a second layer of $ZrO_2$ having a refractive index $n_2=2.1$ as shown in FIG. 1A.

Figure 1B:
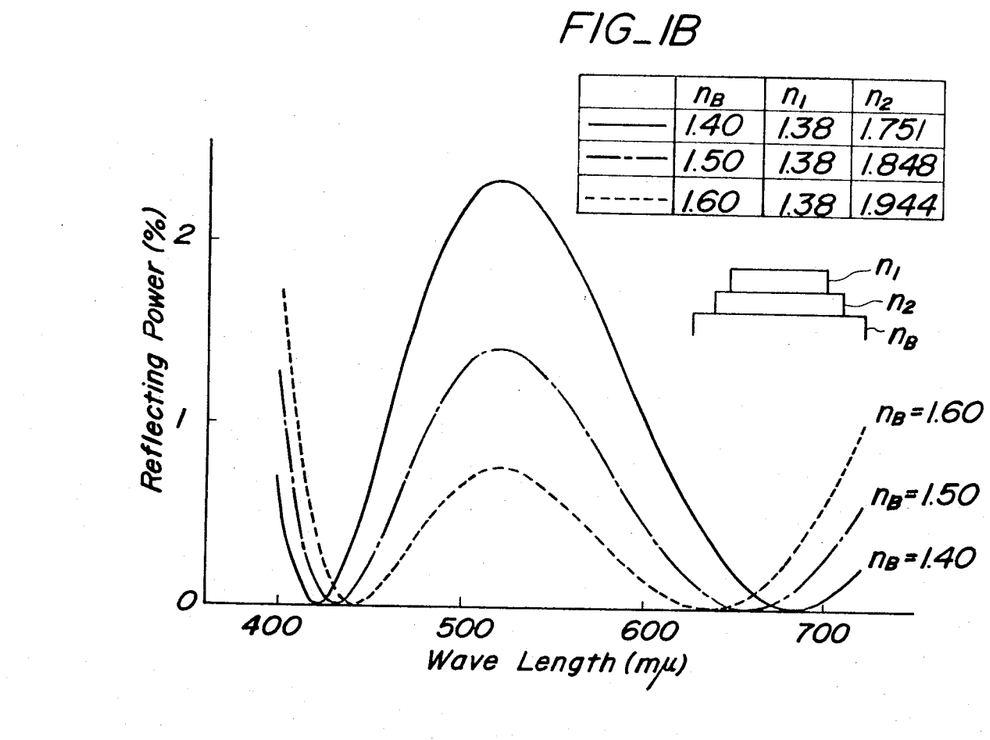

FIG. 1B shows spectral reflecting power characteristic curves of another conventional doublelayer anti-reflection film. In the present film, the refractive index $n_B$ of the glass substrate is made 1.40, 1.50 and 1.60, respectively, and the glass substrates is coated with a first layer of $MgF_2$ having a refractive index $n_1=1.38$ and a second layer having a refractive index $n_2=1.751$, 1.848 and 1.944, respectively.

Figure 2:
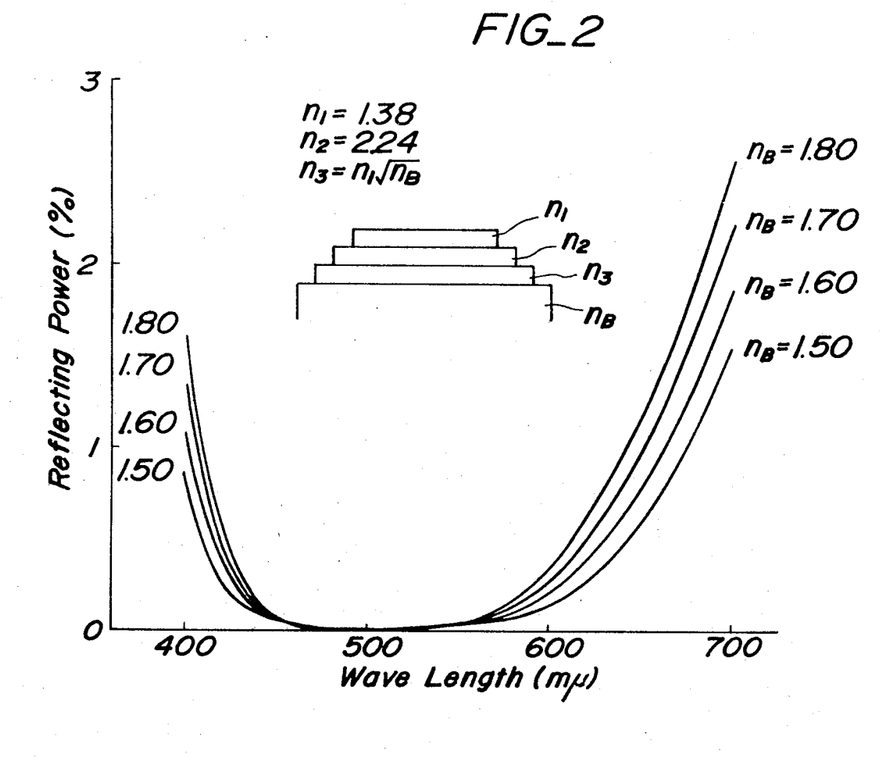
FIG. 2 is spectral reflecting power characteristic curves of a conventional triplelayer anti-reflection film.

FIG. 2 shows spectral reflecting power characteristic curves of a conventional triplelayer anti-reflection film. In the film shown in FIG. 2, a glass substrate having a refractive index $n_B=1.50$, $n_B=1.60$, $n_B=1.70$ and $n_B=1.80$ is coated with a first layer having a refractive index $n_1=1.38$ and a film thickness of 125 m$\mu$, a second layer having a refractive index $n_2=2.24$ and a film thickness of 250 m$\mu$, and a third layer having a refractive index of $n_3=n_1 \sqrt{n_s}$ and a film thickness of 125 m$\mu$. As seen from FIGS. 1A, 1B and 2, the conventional multilayer anti-reflection film has the disadvantage that the reflecting power becomes increased at both the short and long wave length sides of the visible region. The larger the refractive index $n_B$ of the glass substrate, the more the above mentioned phenomenon.

Particularly, the conventional doublelayer anti-reflection film shown in FIG. 1B has the disadvantage that the reflecting power becomes increased also at the intermediate wave length region. The smaller the refractive index $n_B$ of the glass substrate, the more the above mentioned phenomenon. Recently, it has been the common practice to use in the camera lens, etc., a glass having a high refractive index for the purpose of correcting aberrations, and as a result the camera lens, etc. has had the above mentioned highly undesirable disadvantage.

Heretofore, it has been proposed to increase the number of film layers, that is, use a multilayer film whose number of layers is on the order of 7 to 19 so as to decrease the above mentioned reflecting power.

In the conventional anti-reflection film constructed as above described, the use of layers smaller in number causes an excessively large reflecting power, whereas the use of layers larger in number makes it difficult to accurately control the thickness of the film in case of manufacturing it and also renders the film expensive.

An object of the invention is to obviate the above mentioned disadvantage of the conventional multilayer anti-reflection film and provide an improved multilayer anti-reflection film comprising at least one layer and having a significantly excellent reflecting power which is the same as that of a multilayer anti-reflection film whose number of layers is larger than that used in the invention. Accordingly, the present invention provides a multilayer anti-reflection film comprising a glass substrate, a nonhomogeneous film coated on said glass substrate and having a refractive index continuously changing in a direction perpendicular to said nonhomogeneous film and toward the outermost film from a refractive index which is equal to the refractive index of said glass substrate, and an anti-reflection film coated on said nonhomogeneous film and consisting of at least two layers.

Other objects and advantages of the invention will become apparent from a consideration from the following specification, when the specification is considered in conjunction with the accompanying drawing, wherein.

The invention is based upon recognition of the fact that, judging from the spectral reflecting power characteristic curves shown in FIGS. 1A, 1B and 2, the smaller the refractive index $n_B$ of the glass substrate the smaller the reflecting power at both the short and long wave sides and that the larger the refractive index $n_B$ of the glass substrate the smaller the reflecting power at the intermediate wave region.

The invention will now be described with reference to FIGS. 3A, 3B, 4A, 4B and 4C.

Figure 3A:
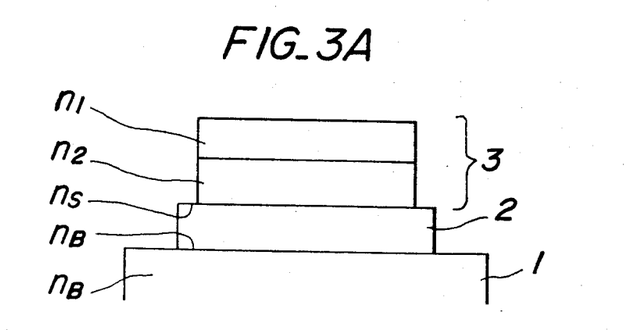
FIGS. 3A and 3B are partial enlarged sectional views of dublelayer and triplelayer anti-reflection films according to the invention, respectively.

In FIG. 3A is shown an enlarged sectional view of a part of a doublelayer reflection proof film according to the invention. The doublelayer reflection film shown in FIG. 3A comprises a glass substrate 1 and a nonhomogeneous film 2 coated on the glass substrate 1 and having a refractive index which changes continuously from a refractive index $n_B$ equal to the refractive index $n_B$ of the glass substrate 1 to a refractive index $n_s$ which is larger than the refractive index $n_B$ of the glass substrate 1 in a direction of the film 2. On the continuously nonhomogeneous film 2 is coated a doublelayer antireflection film 3 whose construction is the same as that of the conventional doublelayer anti-reflection film consisting of two layers.

The nonhomogeneous film 2 according to the embodiment shown in FIG. 3A will now be described in detail. In accordance with the invention, the refractive index of the nonhomogeneous film 2 does not discontinuously change, but changes continuously in a direction perpendicular to said nonhomogeneous film and toward the outermost film from the refractive index $n_B$ of the glass substrate 1 to the refractive index $n_s$ which is larger than the refractive index $n_B$ of the glass substrate 1. As a result, the refractive index of the nonhomogeneous film 2 is larger at that side of the boundary surface between the nonhomogeneous film 2 and the doublelayer anti-reflection film 3 which is adjacent to the latter film 3. Thus, the doublelayer anti-reflection film shown in FIG. 3A has the effect which is the same as that of a doublelayer anti-reflection film coated on the glass substrate 1 and having a large refractive index, and as a result, the pencil of light rays when entered into the nonhomogeneous film 2 is not internally reflected therein.

The material having a larger refractive index for the nonhomogeneous film 2 may be a mixture of $MgF_2$, $CeF_2$, $CeO_2$, etc. These compounds are suitably mixed such that the mixture obtained has a refractive index which is higher than the refractive index $n_B$ of the glass substrate 1. As the material forming that side of the nonhomogeneous film 2 which has a small refractive index equal to the refractive index $n_B$, use may be made of $MgF_2$, NaF, cryolite, etc., or a mixture thereof. The refractive index of the nonhomogeneous film 2 may continuously be changed in a direction perpendicular thereto and toward the outermost film by continuously changing a mixing ratio of the amount of vapors produced when both the materials having large and small refractive indexes are vapor deposited on the glass substrate 1. In the present embodiment, the thickness of the nonhomogeneous film 2 has no influence upon the reflecting power characteristics, but the nonhomogeneous film 2 is required to have a certain thickness, because a thin thickness causes a sudden change of the refractive index of the nonhomogeneous film 2.

The maximum refractive index $n_s$ of that side of the nonhomogeneous film 2 which is adjacent to the double-layer reflection proof film 3 may preferably be 1.70 to 1.95.

If $n_s < 1.70$, the reflecting power is decreased at the ultra-violet and near infra-red regions, but the reflecting power at the visible ray region is increased, thereby rendering the reflection proof film valueless. On the other hand, if $n_s > 1.95$, the reflecting power characteristic curve becomes a quardratic form curve and the reflecting power is increased throughout all the regions including the ultra-violet, near infra-red and visible regions, and as a result, the anti-reflection film could not be used in practice.

Figure 3B:
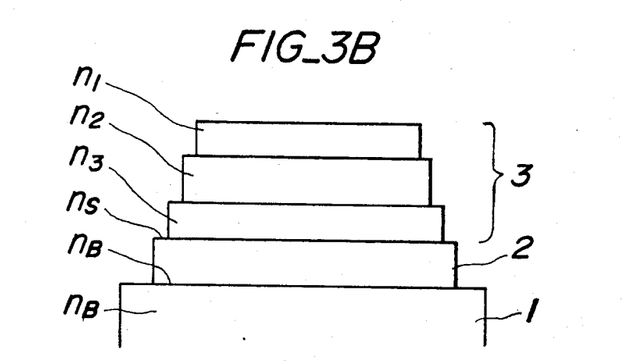

In FIG. 3B is shown an enlarged sectional view of a part of a triplelayer anti-reflection film according to the invention. The triplelayer anti-reflection film shown in FIG. 3B comprises a glass substrate 1 and a nonhomogeneous film 2 coated on the glass substrate 1 and having a refraction index which changes continuously from the refractive index $n_B$ equal to the refractive index $n_B$ of the glass substrates 1 to a refractive index $n_s$ which is smaller than the refractive index $n_B$ of the glass substrate 1 in a direction perpendicular to the film 2 and toward the outermost film. On the continuously nonhomogeneous film 2 is coated a triplelayer anti-reflection film 3 whose construction is the same as that of the conventional triplelayer anti-reflection film consisting of three layers.

The nonhomogeneous film 2 according to the embodiment shown in FIG. 3B will now be described in detail. In accordance with the invention, the refractive index of the nonhomogeneous film 2 does not discontinuously change, but changes continuously in a direction perpendicular thereto and toward the outermost film from the refractive index $n_B$ of the glass substrate 1 to a refractive index $n_s$ which is smaller than the refractive index $n_B$ of the glass substrate 1. As a result, the refractive index of the nonhomogeneous film 2 is smaller at that side of the boundary surface between the nonhomogeneous film 2 and the triplelayer anti-reflection film 3 which is adjacent to the latter film 3. Thus, the triplelayer anti-reflection film shown in FIG. 3B has the effect which is the same as that of a triplelayer anti-reflection film coated on the glass substrate 1 and having a small refractive index, and as a result, the pencil of lighr rays when entered into the nonhomogeneous film 2 is not internally reflected therein.

The material having a larger refractive index for the nonhomogeneous film 2 may be a mixture of $MgF_2$, $CeF_2$, $CeO_2$, etc. These compounds are suitably mixed such that the mixture obtained has a refractive index which is equal to the refractive index $n_B$ of the glass substrate 1. As the material forming that side of the nonhomogeneous film 2 which has a minimum refractive index, use may be made of $MgF_2$, NaF, cryolite, etc. or a mixture thereof. The refractive index of the nonhomogeneous film 2 may continuously be changed in a direction perpendicular thereto and toward the outermost film by continuously changing a mixing ratio of the amount of vapors produced when both the materials having large and small refractive indexes are vapor deposited on the glass substrate 1. The nonhomogeneous film 2 is required to have a certain thickness, because a thin thickness causes a sudden change of the refractive index of the nonhomogeneous film 2.

Figure 4A:
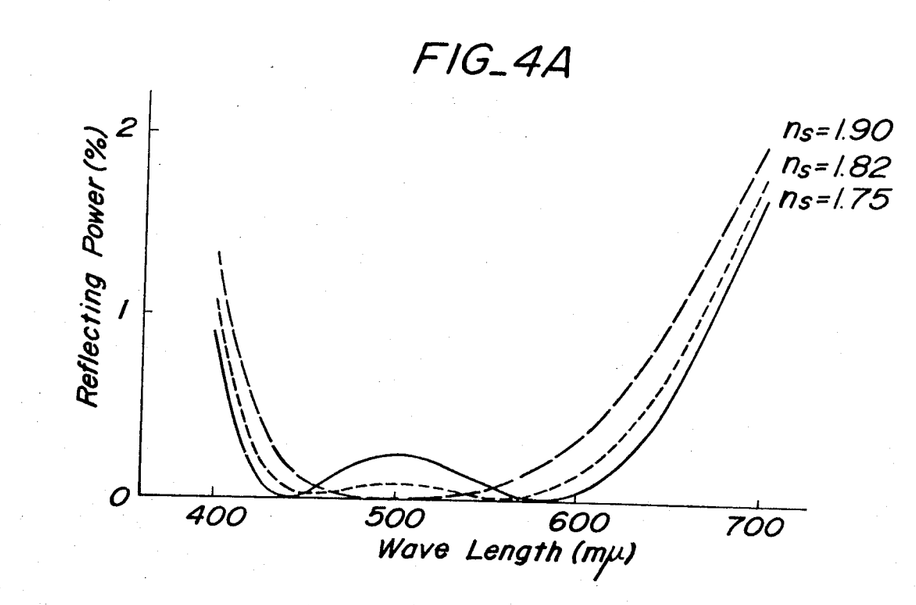
FIG. 4A is spectral reflecting power characteristic curves of the doublelayer anti-reflection film shown in FIG. 3A.

In FIG. 4A are shown spectral reflecting power characteristic curves of the embodiment shown in FIG. 3A. In the present embodiment, the refractive index of the glass substrate $n_B$ is made $n_B=1.50$ and the maximum index $n_s$ of the nonhomogeneous film 2 is made 1.75, 1.82 and 1.90, respectively. The doublelayer anti-reflection film 3 consists of a first layer having an optical thickness of $\lambda/4$ and a second layer having an optical thickness of $\lambda/2$. These two layers are vapor deposited on the non-homogeneous film 2 with $n_1=1.39$, $n_1d_1=125$ m$\mu$ and $n_2=2.08$, $n_2d_2=250$ m$\mu$ where $n_1d_1$ and $n_2d_2$ are optical thicknesses of the first and second layers of the doublelayer anti-reflection film 3.

Figure 4B:
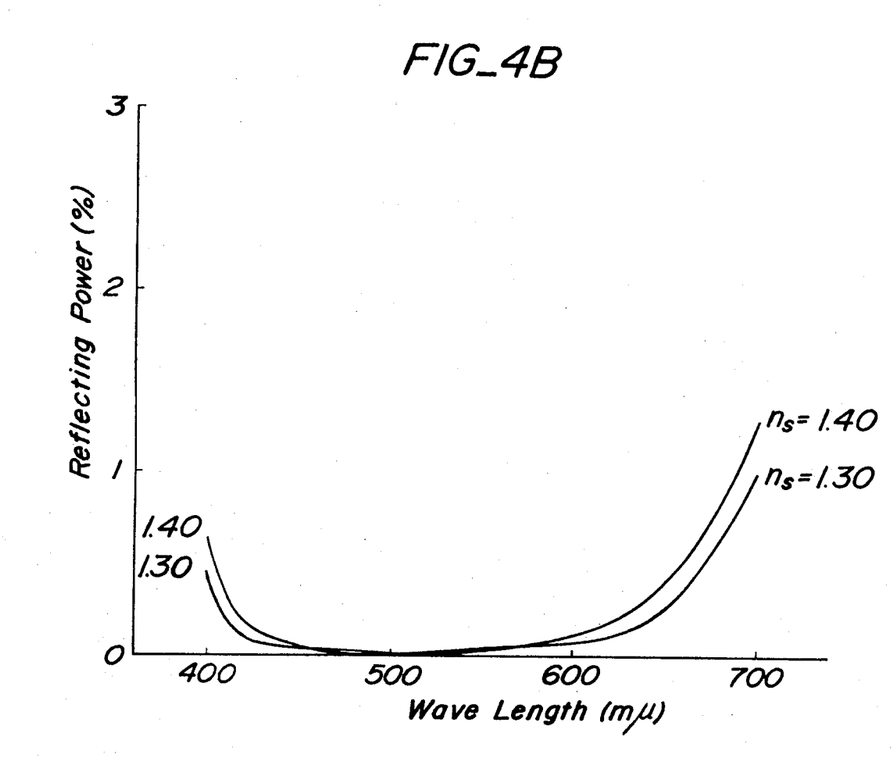
FIGS. 4B and 4C are spectral reflecting power characteristic curves of the triplelayer anti-reflection film shown in FIG. 3B.

In FIG. 4B are shown spectral reflecting power characteristic curves of one embodiment of the triplelayer anti-reflection film shown in FIG. 3B. In the present embodiment, $n_B=1.80$ and the smaller refractive index $n_s$ of that side of the nonhomogeneous film 2 which is adjacent to the anti-reflection film 3 is made small down to $n_s=1.30$ and $n_s=1.40$, respectively. The triplelayer anti-reflection film 3 consists of three layers which are defined by $n_1=1.38$, $n_1d_1=125$ m$\mu$; $n_2=2.24$, $n_2d_2=250$ m$\mu$; $n_3=n_1\sqrt{n_s}$, $n_3d_3=125$ m$\mu$.

Figure 4C:
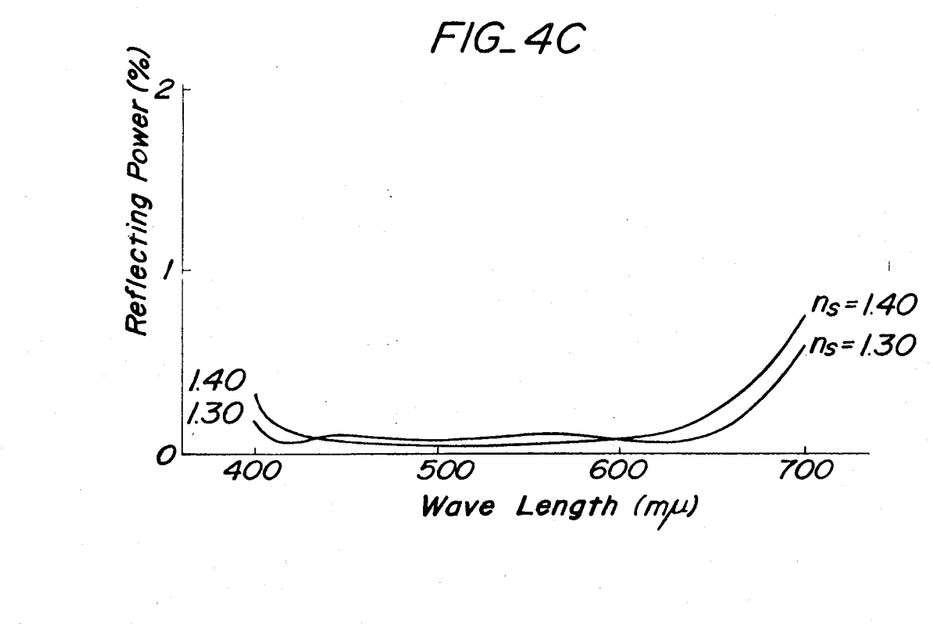

In FIG. 4C are shown spectral reflecting power characteristic curves of another embodiment of the triplelayer anti-reflection film shown in FIG. 3B. In the present embodiment, $n_B=1.80$ and the smaller refractive index $n_s$ of that side of the nonhomogeneous film 2 which is adjacent to the anti-reflection film 3 is made small down to $n_s=1.30$ and $n_s=1.40$, respectively. The triplelayer anti-reflection film 3 consists of three layers and are defined by $n_1=1.38$, $n_1d_1=125$ m$\mu$; $n_2=2.1$, $n_2d_2=250$ m$\mu$; $n_3=1.38\sqrt{n_s}$, $n_3d_3=125$ m$\mu$.

As stated hereinbefore, the invention is capable of reducing the reflecting power of the multilayer anti-reflection film whose number of layers is small throughout the total visible region and hence obtaining flat spectral reflecting power characteristics. The effect of reducing the reflecting power of the multilayer anti-reflection film according to the invention is particularly significant at the intermediate visible region when the glass substrate 1 has a small refractive index and particularly significant at both the short and long wave length sides of the visible region when the glass substrate 1 has a large refractive index. In the spectral reflecting power characteristic curves shown in FIGS. 4A, 4B and 4C, the reflecting powers at the long wave length side are larger than those at the short wave length side. This is caused by the center wave length located at 500 m$\mu$, and can be solved by shifting the center wave length toward the long wave length side.

In FIG. 3A is shown a doublelayer anti-reflection film consisting of first and second layers coated on the nonhomogeneous film 2 and having thicknesses of $\lambda/4$ and $\lambda/2$, respectively. But, a combination the nonhomogeneous film 2 and the anti-reflection film 3 whose first and second layers have thicknesses of $\lambda/2$ and $\lambda/2$, respectively, may also materially improve the spectral reflecting characteristics.

In FIG. 3B is shown a triplelayer anti-reflection film consisting of first, second and third layers coated on the nonhomogeneous film 2. But, a combination of the nonhomogeneous film 2 and an anti-reflection film 3 having one layer, two layers, or more than three layers may also materially improve the spectral reflecting power characteristics.

What is claimed is:

1. A multilayer anti-reflection film comprising a glass substrate, a nonhomogeneous film coated on said glass substrate and having a refractive index continuously changing in a direction perpendicular to said nonhomogeneous film and toward the outermost film from a refractive index which is equal to the refractive index of said glass substrate, and an anti-reflection film coated on said nonhomogeneous film and consisting of at least two layers.

2. A multilayer anti-reflection film as claimed in claim 1 wherein one side of said nonhomogeneous film which has a large refractive index is formed of a mixture of compounds selected from the group consisting of $MgF_2$, $CeF_2$ and $CeO_2$ and the other side of said nonhomogeneous film which has a small refractive index is formed of a material selected from the group consisting of $MgF_2$, $NaF$, cryolite, and mixtures thereof, said continuous change of the refractive index in the direction perpendicular to said nonhomogeneous film and toward the outermost film being effected by continuously changing a mixing ratio of the amount of vapors produced when both the materials having large and small refractive indexes are vapor deposited on said glass substrate.

3. A multilayer anti-reflection film as claimed in claim 1 wherein the refractive index of said nonhomogeneous film is continuously changing in a direction perpendicular to said nonhomogeneous film and toward the outermost film from a refractive index which is equal to the refractive index of said glass substrate to a refractive index which is smaller than the refractive index of said glass substrate and said anti-reflection film coated on said nonhomogeneous film consists of at least three layers.

4. A multilayer anti-reflection film as claimed in claim 3 wherein said anti-reflection film consists of three layers having refractive indexes $n_1$, $n_2$ and $n_3$, respectively, and the smaller refractive index $n_s$ of said nonhomogeneous film is decreased to a refractive index between $n_s=1.30$ and $n_s=1.40$ and the refractive indexes $n_1$, $n_2$ and $n_3$ and the thicknesses $d_1$, $d_2$ and $d_3$ of the first, second and third layers of the anti-reflection film counted from the top thereof are given by $n_1=1.38$, $n_1d_1=125$ m$\mu$; $n_2=2.24$, $n_2d_2=250$ m$\mu$; and $n_3=n_1\sqrt{n_s}$, $n_3d_3=125$ m$\mu$, respectively, the refractive index $n_B$ of the glass substrate being larger than $n_s$.

5. A multilayer anti-reflection film as claimed in claim 3 wherein said anti-reflection film consists of three layers having refractive indexes $n_1$, $n_2$ and $n_3$, respectively, and the smaller refractive index $n_s$ of said nonhomogeneous film is decreased to a refractive index between $n_s=1.30$ and $n_s=1.40$ and the refractive indexes $n_1$, $n_2$ and $n_3$ and the thicknesses $d_1$, $d_2$ and $d_3$ of the first, second and third layers of the anti-reflection film counted from the top thereof are given by $n_1=1.38$, $n_1d_1=125$ m$\mu$; $n_2=2.1$, $n_2d_2=250$ m$\mu$; and $n_3=n_1\sqrt{n_s}$, $n_3d_3=125$ m$\mu$, respectively, the refractive index $n_B$ of the glass substrate being larger than $n_s$.

6. A multilayer anti-reflection film as claimed in claim 1 wherein the refractive index of said nonhomogeneous film is continuously changing in a direction perpendicular to said film and toward the outermost film from a refractive index which is equal to the refractive index of said glass substrate to a refractive index which is larger than the refractive index of said glass substrate, and said anti-reflection film coated on said nonhomogeneous film consists of two layers.

7. A multilayer anti-reflection film as claimed in claim 6 wherein said anti-reflection film consists of two layers having refractive indexes $n_1$ and $n_2$, respectively, and the larger refractive index $n_s$ of said nonhomogeneous film is enlarged to a refractive index between $n_s=1.75$ and $n_s=1.90$, and the refractive indexes $n_1$ and $n_2$ and the thicknesses $d_1$ and $d_2$ of the first and second layers of the anti-reflection film counted from the top thereof are given by $n_1=1.39$, $n_1d_1=125$ m$\mu$ and $n_2=2.08$, $n_2d_2=250$ m$\mu$, respectively, the refractive index $n_B$ of the glass substrate being smaller than $n_s$.

* * * * *